July 25, 1939.   M. L. MASTELLER   2,166,962
HYDRAULIC BRAKE
Filed Nov. 7, 1936   3 Sheets-Sheet 1

INVENTOR,
Malcolm L. Masteller
BY
ATTORNEYS.

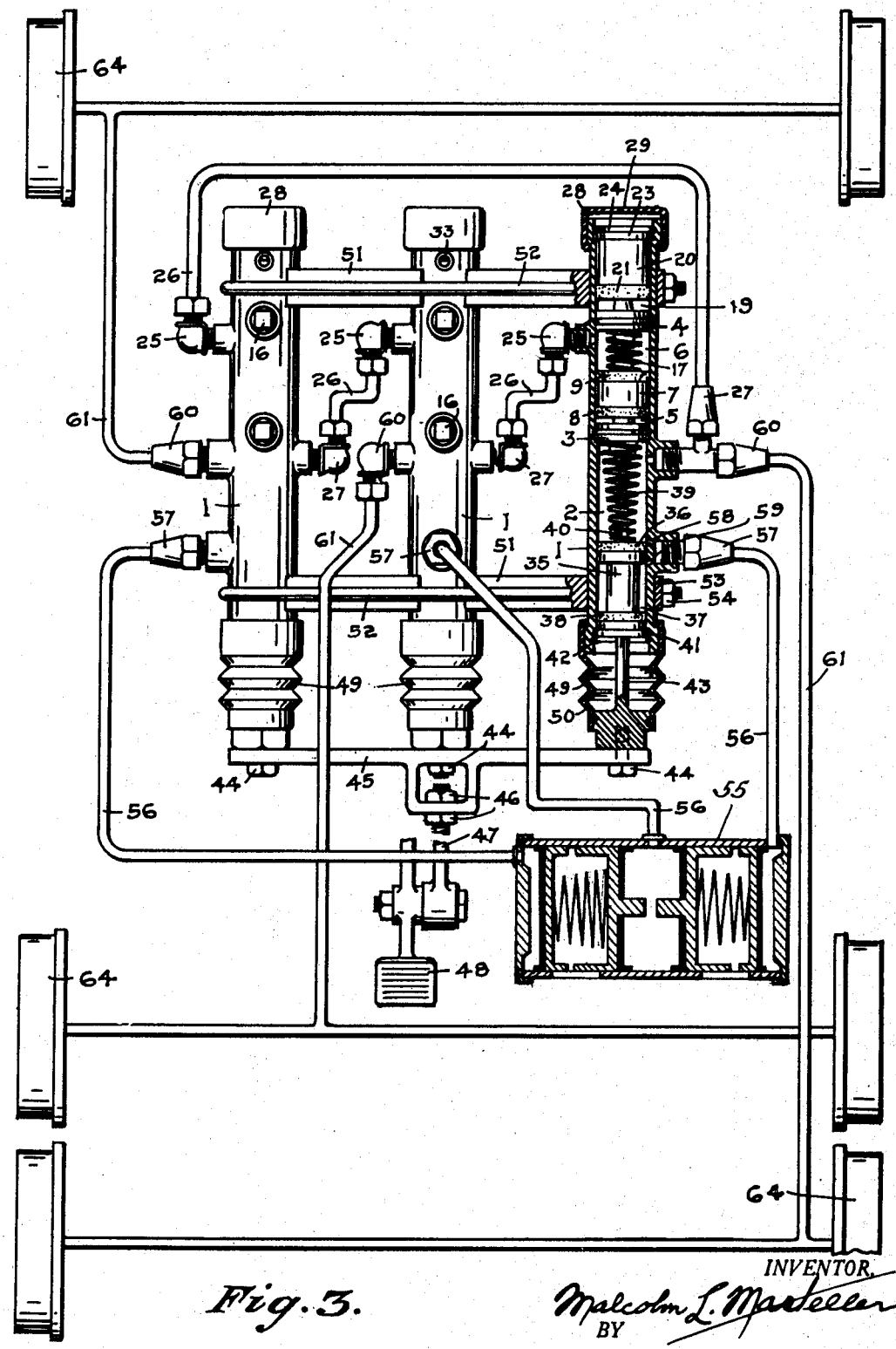

July 25, 1939. M. L. MASTELLER 2,166,962
HYDRAULIC BRAKE
Filed Nov. 7, 1936 3 Sheets-Sheet 3

INVENTOR.
Malcolm L. Masteller
BY
ATTORNEYS.

Patented July 25, 1939

2,166,962

UNITED STATES PATENT OFFICE 2,166,962

HYDRAULIC BRAKE

Malcolm L. Masteller, Miami, Fla.

Application November 7, 1936, Serial No. 109,704

18 Claims. (Cl. 60—54.5)

This invention relates to improvements in hydraulic brake apparatus and more particularly to compensating means for regulating pressures therein.

The range of the brake pedal of a vehicle is limited to the convenient movement of the operator's foot, and, with the leverage ratio desired, gives a limited maximum compressor piston thrust, a part of which must be reserve to provide for the additional displacement required incident to the progressive wear of the brake shoe facings. To preserve with plural hydraulic systems a braking ratio proportioned to a single compressor piston of a given facial area we must, in substituting for instance dual compressors, supply two pistons of one half of the said facial area. Consequently there is available but a small surplus of displaced liquid for operating the equalizing means and the required precision is not obtained by the usual compensating devices comprising a reciprocating member balanced in the supposed center of its relatively short range, as limited by engageable means, because differentials of pressure and friction result in it being normally off center in varying degrees, resulting in deficient equalization.

Another difficulty common to brakes having dual hydraulic systems with separate compressor cylinders and dual compressor pistons operable in unison, together with compensating means for equalizing the pressures built up in said dual hydraulic systems, is that when the equalizing compensator runs to one end of its range due to failure of one of said hydraulic systems during a braking operation, a depression is caused in the remaining hydraulic system detrimental to the proper functioning thereof. Such systems are operated in conjunction with reservoir means adapted to maintain an equalized normal off brakes pressure therein, and valve means for closing off said reservoir means during each braking operation. In plural systems it is essential that said valve means become operative simultaneously, otherwise a quickly repeated braking operation might find them unequally supplied, with such a disparity of liquid in the compressors and wheel lines that an equalizer means of maximum allowable displacement could not take care of it at all, resulting in a faulty application. The most suitable point of operation of said valve means is immediately adjacent to the compressor pistons in their off brakes position, and a depression in the system, brought on during a braking operation would act to prevent proper reseating of said compressor pistons which is essential to the reestablishment of communication between the compressor means and the reservoir means.

The objects therefore of my improvement are, first, to provide means for equalizing the pressures built up in a plurality of hydraulic systems, including reciprocating members with definitely fixed ranges corresponding respectively to each compensating movement; second, to provide means for immediate compensation from the atmosphere for preventing undue depressions in hydraulic systems having a normal off brakes pressure therein.

I attain these objects by mechanism illustrated in the accompanying drawings, in which—

Figure 3 is a diagrammatic plan view, partly in section, showing the invention as applied to the separate braking of three pairs of wheels respectively of a three axled vehicle.

Similar numerals refer to similar parts throughout the several views.

Figure 1:
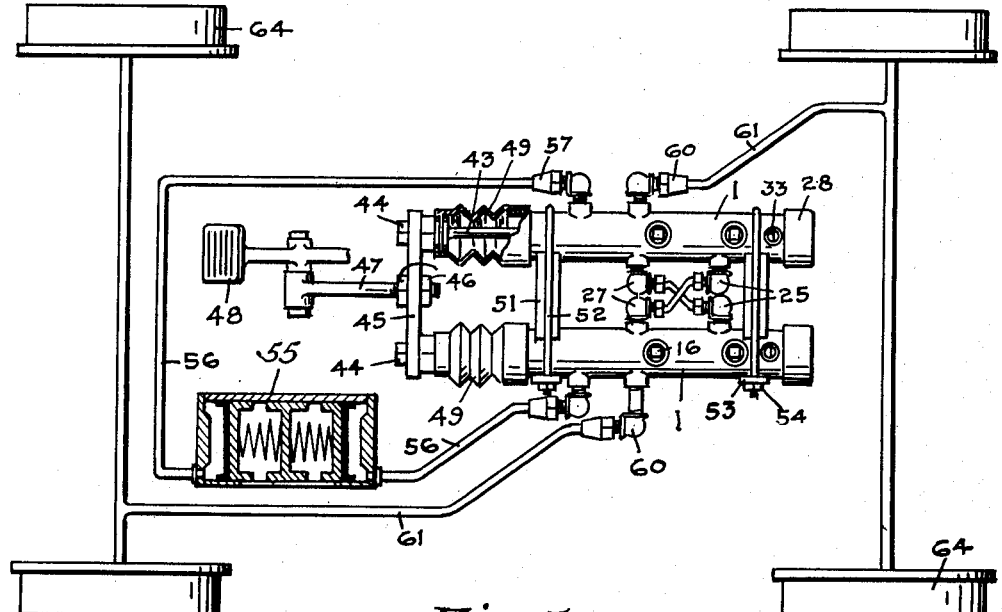
Figure 1 is a diagrammatic plan view, partly in section, showing the invention as applied to the separate braking of front and rear wheels respectively of a vehicle.
Figure 4:
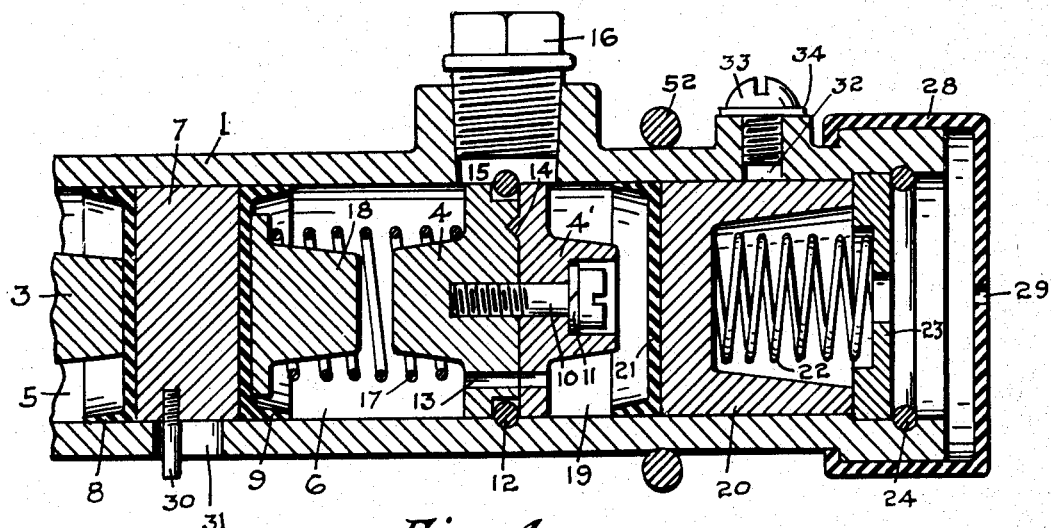
Figure 4 is an enlarged vertical section showing the detail of one of the partition members, and allied parts, of Figures 1 and 2.

I will first describe my preferred form of the device as applicable to dual hydraulic systems, each having its own compressor means, as for the separate operation of the brakes of front and rear wheels respectively of a vehicle, both of said compressors, however, having a common actuator means. See Figures 1 and 2. Casings 1 house the compressor cylinders 2 and also the compensating means. Together with partitions 3 and 4 they form equalization chambers, each of which is divided into two compartments 5—6 by a fluid tight piston 7 with its packing cups 8—9. Said partition members with their lugs constitute piston stops and spring seats but permit the free intercompartmental passage of the operating liquid. They are substantially alike and one of them is shown in detail in Figure 4 to which reference is also made. Members 4 and 4' are fastened together by means of screw bolt 10 with its lock washer 11, over retaining spring 12 which is accommodated within cooperating annular recesses in member 4 and casing 1. They may have passages 13 for the intercompartmental passage of the liquid, in which case they may also be fluted, as shown at 14, to hold members 4—4' in fixed relationship to each other. However, in the present form, ample intercompartmental passage for the liquid is provided above said partitions by the arrangement of ports 15 with their plugs 16, primarily constituting bleeder vents, each serving two compartments, and positioned to facilitate the insertion and removal of said partitions and their said retaining springs.

Compartments 6 are each provided with a compression spring 17 urging the respective piston 7 toward partition 3 so that, with an equality of fluid pressure acting upon both sides of it, said piston is normally and yieldingly held seated on said partition 3. Said partitions 3 and 4 together with spacing cone 18, which is formed to serve as a seat for spring 17, constitute engageable means limiting the ranges of said pistons to a suitable conservation of the operating liquid in the remaining hydraulic system in the event of failure of one of them, yet enabling a sufficient movement for adequate equalization. Said spacing cones 18 may be of different lengths for the ready adaptation of the device to the hydraulic systems to which it is to be applied, according to the displacement requirements thereof.

Figure 2:
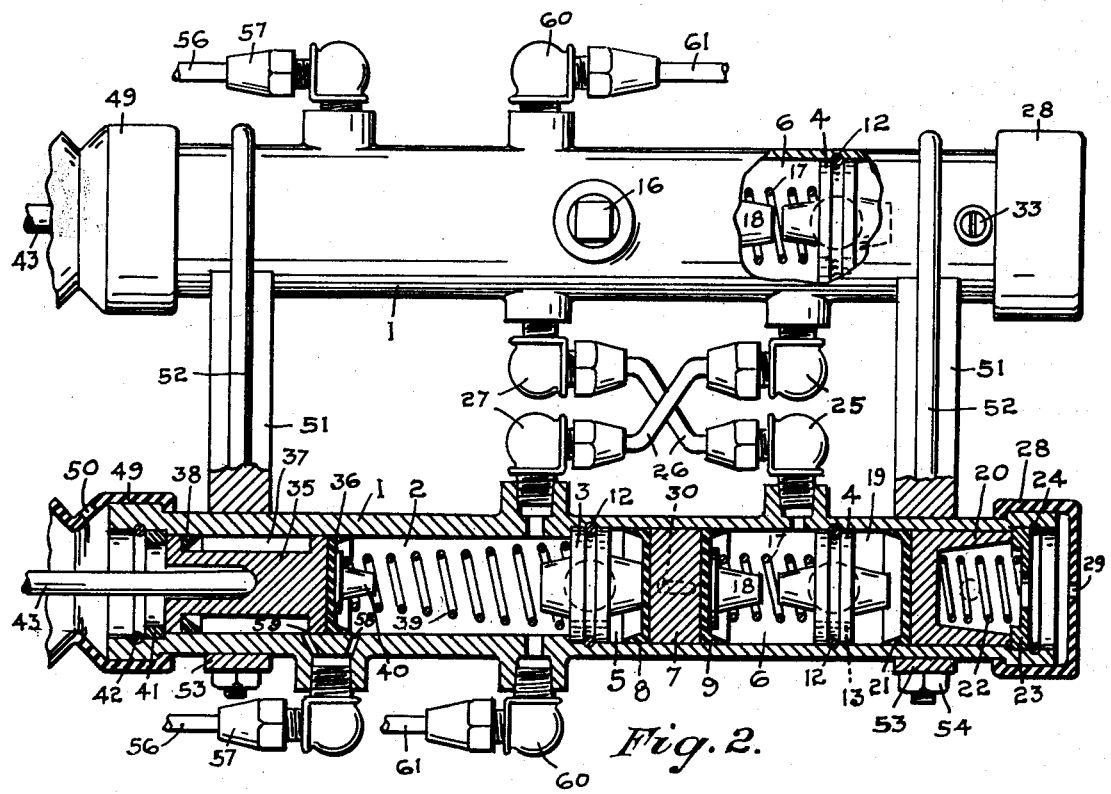
Figure 2 is an enlarged plan view, partly in section, illustrating in detail the dual master cylinders as shown in Figure 1.

When front and rear wheels respectively are provided with fluid motors having brake actuating pistons of different facial area for imparting a greater or lesser force to the applications of the respective brake shoes, the ranges of equalizing pistons 7 may advantageously be of different lengths, as in this case, with an equality of brake shoe adjustment, there is a differential of required displacement which increases with the progressive wear of the brake shoe facings. The equalization with this device is essentially of transferred displacement from one hydraulic system to the other, and it is desirable that if the assisting hydraulic system should fail, the remaining one not be called upon for a greater resulting compensation than is necessary to a proper normal working of the system. This feature is illustrated in Figure 2, in which the left hand cylinder contains the longer spacing cone 18, resulting in a shorter range for the respective piston 7.

Beyond partitions 4 is another liquid containing compartment 19, then piston 20 which with its packing cup 21 forms a fluid tight end for the corresponding compartment 19. Each of pistons 20 is provided with a chambered recess for the accommodation of compression spring 22 which seats against said piston and in an annular recess in washer 23 which supports it in a central position, said washer being held against an annular shoulder in casing 1 by retaining spring 24 which in turn is held in an annular recess in casing 1 by its own resilience. Compression springs 22 are proportioned in relation to the facial area of pistons 20 so that the normal off brakes hydraulic pressure acting upon said pistons holds them seated outwardly, against washers 23, said compression springs 22 becoming active only in the event of a depression in the hydraulic systems, as hereinafter explained.

Each of compartments 6 is provided with fitting 25, adapted for connecting conduit 26 which is also connected, by means of fitting 27, to the other compressor cylinder 2; all in such manner that each hydraulic system is associated with and its liquid acting upon one face of one piston 7 and the opposite face of the other piston 7, said pistons being yieldingly held at one end of their respective ranges, one of them having primary compensating movement toward one of said dual hydraulic systems and the other one having primary compensating movement toward the other of said dual hydraulic systems.

Figure 5:
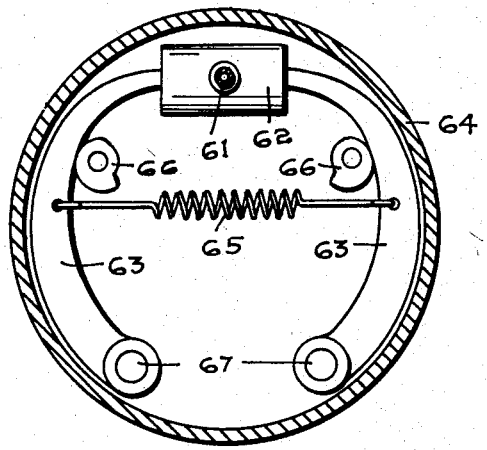
Figure 5 is a vertical section of brake drum, showing brake shoes and allied parts.
Figure 6:
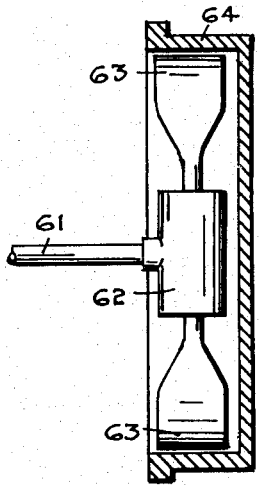
Figure 6 is a horizontal section of brake drum, showing brake shoes and allied parts.

Additional elements are as follows: See Fig. 1, 2, and 4; boots 28 covering the ends of casing 1, each of them being provided with breather port 29; pins 30 having threaded engagement with pistons 7 and projecting through slots 31 in casings 1, for exteriorly indicating the movement of said pistons; ports 32 with screw plugs 33 and lock washers 34 for lubricating pistons 20 with the operating liquid, or other suitable lubricant such as a component thereof; compressor pistons 35 with their primary packing cups 36, annular recesses 37, and secondary packing cups 38; compression springs 39 with their seating members 40, normally holding said compressor pistons seated against washers 41 which are held against annular shoulders in casings 1 by retaining springs 42 which in turn are held in annular recesses in casings 1 by their own resilience; plungers 43 for advancing said compressor pistons, said plungers being attached by screw bolts 44 to cross head 45 which has adjustable threaded engagement, secured by lock nuts 46, with rod 47 which is conveniently attached to manual actuating means 48; boots 49 having breather ports 50; spacing members 51, which may be upbuilt portions of the mounting bracket; U bolts 52 with clamps 53 and nuts 54, which bind said casings and associated parts into a single unit; pressure reservoir 55 adapted to contain the liquid supply pertaining to the several hydraulic systems in independent compartments, compensate for variations in its volume due to changes in temperature, and maintain a normal pressure throughout the hydraulic systems, (such a reservoir means is fully described in my co-pending application, Serial Number 104,851, series of 1935); conduits 56 leading from said reservoir means to said compressor means, with fittings 57 for attaching them thereto; intake ports 58 admitting the liquid into compressor cylinders 2, and ports 59 associating said reservoir means with said annular chambers formed between said compressor pistons and the walls of casings 1, said ports 59 serving to fill said chambers with the operating liquid, the purpose of said chambers and said secondary packing cups being to prevent the loss of liquid around said compressor pistons after the lips of their primary packing cups 36 have passed intake ports 58 (no bleeder means is shown for expelling air from annular chambers 37, for the reason that fittings 57 and ports 58 and 59 may in practice be positioned at the topmost part of casings 1); fittings 60 and conduits 61 leading to fluid motors 62 (see also Figs. 5 and 6) which actuate brake shoes 63 into engagement with drums 64 against the resistance of extension springs 65 which normally hold said brake shoes seated upon adjustable stops 66 which are rigidly mounted in relation to said brake shoes which pivot on anchor bolts 67.

In the operation of the brakes, compressor pistons 35 are advanced in unison, displacing an equal amount of liquid from the respective compressor cylinders 2, any inequalities of displaced liquid required to operate the brake actuating motors of front and rear wheels respectively being compensated by a movement of the corresponding piston 7 toward any depression in either of said dual hydraulic systems until an equilibrium is established between them, thereby bringing all shoes into proper braking engagement. Upon release of the braking pressures, said piston 7 returns to its normal off brakes position, actuated by a corresponding movement of the operating liquid which is set in motion by the retractile force of extension springs 65.

Pistons 7 and compression springs 17 are proportioned in relation to each other so that with an equality of fluid pressure acting upon both faces of one of said pistons 7, the resilience of the corresponding compression spring 17 is but slightly more than sufficient to normally sustain said piston seated upon its stop 3. Consequently in the event of failure of one of said dual hydraulic systems, under the off brakes condition, the normal off brakes pressure in the remaining hydraulic system, acting upon the corresponding piston 7 will over-come the resistance of compression spring 17, move said piston 7 to its seat 4 at the outer end of its range and sustain it there, this movement being compensated by an inflow of liquid from pressure reservoir 55. If said failure, however, should occur during a braking operation, when said pressure reservoir means is closed off by the valve constituted by compressor piston 35 and intake port 58, there would be a consequent slight depression, upon release of the brakes, in the remaining hydraulic system, and unless said failure be due to a major rupture which would permit a free inflow of air from the atmosphere, said equalizing piston 7 would be restrained by a vacuum from relieving said slight depression in said remaining hydraulic system, preventing the proper reseating of compressor piston 35 and the opening of said valve means for reestablishment of communication between the compressor means and reservoir means of said remaining hydraulic system. Since all failures are not due to major ruptures but can be occasioned by leakages under the braking pressures which are imperceptible when said braking pressures are released, it is evident that said hydraulic system which has failed may remain inadequately associated with the atmosphere to enable said compensation to readily take place, therefore each of said dual hydraulic systems is provided with an additional compensating means, including piston 20, compression spring 22, and port 29, as hereinbefore described. In the event of a depression in one or both of said dual hydraulic systems it will normally be compensated by an inflow of liquid from the pressure reservoir means but if it should occur when said reservoir means is closed off, as during a braking operation, compression springs 22 will move pistons 20 inwardly against the resistance of the diminishing hydraulic pressure, relieving said depression and enabling a restoration of communication between said compressor means and said reservoir means, upon the reestablishment of which, the normal off brakes pressure will restore said pistons 20 to the outer ends of their respective ranges, as also the corresponding piston 7 if one of said dual hydraulic systems be out of commission, and sustain them there.

The bore of the equalizing chamber is here illustrated with a greater diameter than the compressor cylinder. This is not essential but is intended to illustrate the proportioning of the piston faces to the resilient means as hereinbefore described.

I will now describe the modifications required for adaptation of the device to three hydraulic systems, each having its own compressor means, as for the separate operation of the brakes corresponding respectively to three braking axles, as of a three axled vehicle. See Fig. 3. To coordinate the additional hydraulic system there is added a third similar pressure regulating unit as hereinbefore described and the hook-up is as follows: Each of compartments 5 is directly associated with the corresponding compressor cylinder 2 by means of passage 13 in partition 3, and each of compartments 6 is connected by means of its conduit 26 and fittings 25-27 to the next adjoining compressor cylinder 2, all in series, the last being so connected to the first; all in such manner that each hydraulic system is associated with and its liquid acting upon one end of one of pistons 7 and the opposite end of another of pistons 7, said pistons 7 being yieldingly held at one end of their respective ranges and all having primary compensating movement in a common direction in relation to the liquid contained in said hydraulic systems.

What I claim is:

1. In a brake having dual hydraulic systems; means for equalizing the pressures built up therein, comprising two reciprocating members, each disposed between two liquid containing compartments; means for associating one of said compartments pertaining to each of said reciprocating members with one of said dual hydraulic systems in such manner that they form a part of it; means for associating the other of said compartments pertaining to each of said reciprocating members with the other of said dual hydraulic systems in such manner that they form a part of it; engageable means limiting the ranges of said reciprocating members; and resilient means urging said reciprocating members to one end of their respective ranges and yieldingly sustaining them there, all in such manner that each of said reciprocating members have primary compensating movement toward a different one of said dual hydraulic systems.

2. In a brake having a plurality of hydraulic systems; means for equalizing the pressures built up therein, comprising a plurality of reciprocating members, each disposed between two liquid containing compartments; means for associating one of said compartments pertaining to each of said reciprocating members with one of said plural hydraulic systems in such manner that it form a part thereof; means for associating the other of said compartments pertaining to each of said reciprocating members with another of said plural hydraulic systems in such manner that it form a part thereof, all in series; engageable means limiting the ranges of said reciprocating members; and resilient means urging each of said reciprocating members to one end of its range, and yieldingly sustaining it there; all in such manner that all of said reciprocating members have primary compensating movement in a common direction, in relation to the operating liquid contained in the several hydraulic systems.

3. In a brake having dual hydraulic systems, an equalizing device in combination therewith comprising two chambers; a reciprocating member in each of said chambers dividing it into two compartments; means for associating one of said compartments of each of said chambers with one of said hydraulic systems in such manner that it form a part thereof; means for associating the other of said compartments of each of said chambers with the other of said hydraulic systems in such manner that it form a part thereof; engageable means limiting the ranges of said reciprocating members; and resilient means urging said reciprocating members to normally rest upon said engageable means at one end of their respective ranges; all in such manner that each of said reciprocating members have primary compensating movement toward a different one of said dual hydraulic systems.

4. In a brake having a plurality of hydraulic systems, an equalizing device in combination therewith comprising a plurality of chambers; a reciprocating member in each of said chambers dividing it into two compartments; means for associating one of said compartments of each of said chambers with one of said hydraulic systems in such manner that it form a part thereof; means for associating the other of said compartments of each of said chambers with another of said hydraulic systems in such manner that it form a part thereof, all in series; engageable means limiting the ranges of said reciprocating members; resilient means associated with each of said reciprocating members urging it to one end of its range, all in such manner that all of said reciprocating members have primary compensating movement in a common direction in relation to the operating liquid contained in the several hydraulic systems.

5. In a brake having dual hydraulic systems and means for maintaining a normal off brakes pressure therein; a compensating device in combination therewith, comprising two chambers; a reciprocating member in each of said chambers, hereinafter referred to as reciprocating equalizing members, having the effect of dividing each of said chambers into two compartments; means for associating one of said compartments of each of said chambers with one of said dual hydraulic systems in such manner that they form a part of it; means for associating the other compartment of each of said chambers with the other of said dual hydraulic systems in such manner that they form a part of it; engageable means limiting the ranges of said reciprocating equalizing members; resilient means acting upon one end of one of said reciprocating equalizing members and resilient means acting upon one end of the other of said reciprocating equalizing members, urging them to rest upon said engageable means at one end of their respective ranges in such manner that each of said dual reciprocating equalizing members have primary compensating movement toward a different one of said dual hydraulic systems; and means, operable in the event of failure of one of said dual hydraulic systems, to relieve a consequent depression in the remaining hydraulic system, incident to one of said reciprocating equalizing members having moved outwardly from said remaining hydraulic system and being restrained by vacuum from readily returning to its normal position, comprising, in combination with each of said dual hydraulic systems, a third reciprocating member, operating within a chamber of said hydraulic system, means for associating the operating liquid with one face of said third reciprocating member so that it act to urge said third reciprocating member outwardly from said hydraulic system, means for associating the other face of said third reciprocating member with the atmosphere, engageable means limiting the range of said third reciprocating member, and resilient means acting upon said third reciprocating member urging it inwardly toward said hydraulic system, the facial aspect of said third reciprocating member being proportioned in relation to said resilient means so that the normal hydraulic pressure in said hydraulic system, acting upon said third reciprocating member, be sufficient to overcome the resistance of said resilient means, move said third reciprocating member to the outer limit of its range and normally sustain it there, responsive, in the event of a depression in said hydraulic system, to inward movement, actuated by said resilient means against the resistance of the diminishing hydraulic pressure.

6. In a brake having a plurality of hydraulic systems and means for maintaining a normal off brakes pressure therein; a compensating device in combination therewith comprising a plurality of chambers; a reciprocating member in each of said chambers, hereinafter referred to as reciprocating equalizing members, having the effect of dividing each of said chambers into two compartments; means for associating one of said compartments of each of said chambers with one of said hydraulic systems in such manner that it form a part thereof; means for associating the other of said compartments of each of said chambers with another of said hydraulic systems in such manner that it form a part thereof, all in series; engageable means limiting the ranges of said reciprocating equalizing members; resilient means associated with each of said reciprocating equalizing members urging it to one end of its range and yieldingly sustaining it there, all in such manner that all of said reciprocating equalizing members have primary compensating movement in a common direction, in relation to the operating liquid contained in the several hydraulic systems; and means, operable in the event of failure of one or more of said hydraulic systems, to relieve any consequent depression in the remainder of said hydraulic means, incident to one or more of said reciprocating equalizing members having moved outwardly from said remaining hydraulic means and being restrained by vacuum from readily returning to normal off brakes position, comprising, in combination with each of said hydraulic systems, a third reciprocating member, operating within a chamber of said hydraulic system, means for associating the operating liquid with one face of said third reciprocating member so that it act to urge said third reciprocating member outwardly from said hydraulic system, means for associating the other face of said third reciprocating member with the atmosphere, engageable means limiting the range of said third reciprocating member, and resilient means acting upon said third reciprocating member urging it inwardly toward said hydraulic system, the facial aspect of said third reciprocating member being proportioned in relation to said resilient means so that the normal hydraulic pressure in said hydraulic system, acting upon said third reciprocating member, be sufficient to overcome the resistance of said resilient means, move said third reciprocating member to the outer limit of its range and normally sustain it there, responsive, in the event of a depression in said hydraulic system, to inward movement, actuated by said resilient means against the resistance of the diminishing hydraulic pressure.

7. In an hydraulic braking system having means for maintaining a normal off brakes pressure therein; a depression relieving compensating device, comprising a casing and a chamber therein; a reciprocating member in said chamber having the effect of closing off a liquid containing compartment, means for associating said compartment with said hydraulic system in such manner that it form a part thereof, the operating liquid of said hydraulic system acting upon one side of said reciprocating member to urge it outwardly from said hydraulic system; means for associating the other side of said reciprocating member with the atmosphere; engageable means limiting the range of said reciprocating member; and resilient means acting upon said reciprocating member urging it inwardly toward said hydraulic system; the face of said reciprocating member being proportioned in relation to said resilient means so that the normal hydraulic pressure in said hydraulic system, acting upon said reciprocating member, be sufficient to overcome the resistance of said resilient means, move said reciprocating member to the outer limit of its range and normally sustain it there, responsive, in the event of a depression in said hydraulic system, to inward movement, actuated by said resilient means against the resistance of the diminishing hydraulic pressure.

8. In braking apparatus having dual hydraulic systems and means for maintaining a normal off brakes pressure therein; a pressure responsive compensating device, comprising two chambers, a reciprocating member in each of said chambers dividing it into two compartments, means for associating one of said compartments of each of said chambers with one of said dual hydraulic systems in such manner that they form a part of it, means for associating the other of said compartments of each of said chambers with the other of said dual hydraulic systems in such manner that they form a part of it, engageable means limiting the ranges of said reciprocating members, and resilient means associated with each of said reciprocating members urging them to rest upon said engageable means at one end of their respective ranges, so that each of said reciprocating members have primary compensating movement toward a different one of said dual hydraulic systems.

9. In braking apparatus having dual hydraulic systems and means for maintaining a normal off brakes pressure therein; a pressure responsive compensating device, comprising two chambers, a reciprocating member in each of said chambers dividing it into two compartments, means for associating one of said compartments of each of said chambers with a separate one of said dual hydraulic systems in such manner that it form a part thereof, means for associating the other of aid compartments of each of said chambers with the other of said dual hydraulic systems in such manner that it form a part thereof, engageable means limiting the ranges of said reciprocating members, resilient means associated with each of said reciprocating members urging them to rest upon said engageable means at one end of their respective ranges, in such manner so that each of said reciprocating members have primary compensating movement toward a different one of said dual hydraulic systems, and means for rendering said reciprocating members inactive upon failure of one of said dual hydraulic systems, said latter means including a proportioning of the facial area of said reciprocating members and the retractile force of said resilient means, in their relation to each other, so the action of the normal off brakes pressure in the remaining hydraulic system, acting upon said reciprocating member, will overcome said resilient means and sustain said reciprocating member at the outer end of its range.

10. In braking apparatus having a plurality of hydraulic systems and means for maintaining a normal off brakes pressure therein; a pressure responsive compensating device comprising a plurality of chambers, a reciprocating member in each of said chambers dividing it into two compartments, means for associating one of said compartments of each of said chambers with a separate one of said plural hydraulic systems in such manner that it form a part thereof, means for associating the other of said compartments of each of said chambers with another of said plural hydraulic systems in such manner that it form a part thereof, all in series, engageable means limiting the ranges of said reciprocating members, resilient means associated with each of said reciprocating members urging them to rest upon said engageable means at one end of their respective ranges so that all of said reciprocating members have primary compensating movement in a common direction in relation to the liquid contained in said hydraulic systems.

11. In braking apparatus having a plurality of hydraulic systems and means for maintaining a normal off brakes pressure therein; a pressure responsive compensating device comprising a plurality of chambers, a reciprocating member in each of said chambers dividing it into two compartments, means for associating one of said compartments of each of said chambers with a separate one of said plural hydraulic systems in such manner that it form a part thereof, means for associating the other of said compartments of each of said chambers with another of said plural hydraulic systems in such manner that it form a part thereof, all in series, engageable means limiting the ranges of said reciprocating members, resilient means associated with each of said reciprocating members urging them to rest upon said engageable means at one end of their respective ranges so that all of said reciprocating members have primary compensating movement in a common direction in relation to the liquid contained in said hydraulic systems, and means operable in the event of failure of any of said plural hydraulic systems, for rendering the corresponding reciprocating member inactive, said latter means including a proportioning of the facial area of said reciprocating members and the retractile force of said resilient means, in their relation to each other, so the action of the normal off brakes pressure in the remaining hydraulic means, acting upon said reciprocating member, will overcome said resilient means and sustain said reciprocating member at the outer end of its range.

12. In a brake in which dual hydraulic systems cooperate, a compensating device for equalizing the pressures therein, comprising dual reciprocating members, each operating between two liquid containing compartments; means for associating one of said liquid containing compartments pertaining to each of said reciprocating members with one of said dual hydraulic systems in such manner that it form a part thereof; means for associating the other of said compartments pertaining to each of said reciprocating members with the other hydraulic system in such manner that it form a part thereof; engageable means limiting the ranges of said reciprocating members; and resilient means associated with each of said reciprocating members urging them toward the engageable means at one end of their respective range so that they normally seat thereon; all in such manner that one of said reciprocating members be free to move toward a depression in one of said duel hydraulic systems and the other reciprocating member be free to move toward a depression in the other hydraulic system.

13. In a brake having a plurality of hydraulic systems, a compensating device for equalizing the pressures therein, comprising a plurality of pressure responsive reciprocating members, each disposed between two liquid containing compartments; means for associating one of said compartments pertaining to each of said reciprocating members with a separate one of said hydraulic systems in such manner that it form a part thereof and means for associating the other of said compartments pertaining to each of said reciprocating members with another of said hydraulic systems in such manner that it form a part thereof, all in series; engageable means limiting the ranges of said reciprocating members; and resilient means urging each of said reciprocating members toward the engageable means at one end of its range so that it normally seat thereon; all in such manner that all primary compensating movements be in a common direction in relation to said hydraulic systems.

14. In a brake having hydraulic means for its operation and means for maintaining a normal off brakes hydraulic pressure therein; a device associated therewith comprising a chamber, a reciprocating member in said chamber, engageable means limiting the range of said reciprocating member, means for associating one end of said chamber with said hydraulic means in such manner that it form a part thereof and permit the operating liquid of said hydraulic means to act upon one side of said reciprocating member, breather means associating the other end of said chamber with the atmosphere, resilient means urging said reciprocating member inwardly toward said hydraulic means but being proportioned in relation to the face of said reciprocating member and the normal hydraulic pressure acting thereon so that said hydraulic pressure be sufficient to overcome said resilient means and keep said reciprocating member normally seated at the outer end of its range, responsive to inward movement whenever said hydraulic pressure fall below a predetermined degree.

15. In a brake having hydraulic means for its operation and means for maintaining a normal off brakes hydraulic pressure therein; in combination, compressor means for creating the additional pressures required for operating the brakes, including valve means for closing off said normal off brakes hydraulic pressure maintaining means during each braking operation, said valve means being operable at a predetermined point in relation to the operation of said compressor means; and compensating means, operable in the event of a depression in said hydraulic means, to facilitate the return movement of said compressor means to said predetermined point at which said valve means becomes operable, said compensating means comprising a casing and a chamber therein; a pressure responsive reciprocating member in said chamber having the effect of closing off a liquid containing compartment therein; engageable means limiting the range of said reciprocating member; means for associating said liquid containing compartment with said hydraulic means in such manner that it form a part thereof, the operating liquid of said hydraulic means contacting one face of said reciprocating member; means for associating the other face of said reciprocating member with the atmosphere; and resilient means urging said reciprocating member inwardly toward said hydraulic means but being proportioned in relation to the face of said reciprocating member and the normal hydraulic pressure acting thereon so that said normal hydraulic pressure be sufficient to overcome said resilient means and sustain said reciprocating member normally seated at the outer end of its range, responsive to inward movement whenever said hydraulic pressure fall below a predetermined degree.

16. In a brake having a plurality of hydraulic systems, as one for operating the brakes pertaining to each axle of a vehicle, and fluid motors of unequal displacement requirements for actuating the braking means pertaining respectively to the several axles, as when those corresponding to one of said hydraulic systems have larger cylinder bores and pistons than the others with the object of imparting a greater and a lesser force to the respective braking units; in combination, a compressor cylinder associated with and forming a part of each hydraulic system, and a reciprocating member therein for creating pressure and displacing liquid therefrom; means for advancing said reciprocating members in unison, displacing liquid therefrom in equal quantity; and means for equalizing the pressures built up in the several hydraulic systems, compensating for said normal inequality in displacement requirements as well as for inequalities due to uneven wear of the brake shoe facings, including a plurality of reciprocating members, each disposed in a chamber of said hydraulic means and having the effect of dividing said chamber into two compartments; means for associating one of said compartments pertaining to each of said reciprocating members with one of said plural hydraulic systems in such manner that it form a part thereof; means for associating the other of said compartments pertaining to each of said reciprocating members with another of said hydraulic systems in such manner that it form a part thereof; resilient means yieldingly holding each of said reciprocating members at one end of its range with primary compensating movement in one direction only; and engageable means limiting the ranges of said reciprocating members, said ranges being independently proportioned to the displacement requirements of each of said hydraulic systems.

17. In an hydraulic braking system, in combination, a compressor comprising a casing and a chamber therein (hereinafter called compression chamber), means for associating said compression chamber with said hydraulic system in such manner that it form a part thereof, a piston (hereinafter called compressor piston) operable in said compression chamber for building up pressure therein, resilient means acting upon said compressor piston urging it toward its normal off brakes position, and means for operating said compressor piston; a pressure reservoir including a casing and a chamber therein (hereinafter called reservoir chamber) and means for maintaining a normal pressure therein, and means for associating said reservoir chamber with said hydraulic system in such manner that it normally form a part thereof; means for interrupting communication between said compression chamber and said reservoir chamber at an intermediate point of each braking operation and in the early part thereof; and a depression relieving device, including a casing and a chamber therein (hereinafter called auxiliary supply chamber), a pressure responsive reciprocating member in said auxiliary supply chamber having the effect of closing off a liquid containing compartment therein (hereinafter called auxiliary supply compartment), engageable means forming a seat for said pressure responsive reciprocating member at the outer end of said auxiliary supply chamber (being the outer end as related to said hydraulic system), means for associating said auxiliary supply compartment with said hydraulic system in such manner that it form a part thereof and be always associated with said compression chamber, the liquid of said hydraulic system contacting one face of said pressure responsive reciprocating member and normally sustaining it seated outwardly upon said engageable means, and means for associating the other face of said pressure responsive reciprocating member with the atmosphere; said combination constituting means, operable in the event of a slight leakage from the hydraulic system during a braking operation, enabling the unrestrained return of said compressor piston to said point where communication was interrupted between said compression chamber and said reservoir chamber.

18. In an hydraulic braking system, the combination of claim 17, and in addition, resilient means acting upon said pressure responsive reciprocating member urging it to contract said auxiliary supply compartment, but being inadequate to do so against the normal resistance of the liquid of said hydraulic system acting upon the opposite side of said pressure responsive reciprocating member; constituting means to take up, after release of the brakes, any slack in said hydraulic system occasioned by any slight leakage therefrom occurring during a braking operation when said reservoir chamber is cut off from the balance of said hydraulic system.

MALCOLM L. MASTELLER.